(12) United States Patent
Zhang

(10) Patent No.: US 9,651,794 B2
(45) Date of Patent: May 16, 2017

(54) COLOR FILTER AND PREPARATION METHOD THEREOF, AND DISPLAY DEVICE

(71) Applicants: BOE TECHNOLOGY GROUP CO., LTD., Beijing (CN); BEIJING BOE DISPLAY TECHNOLOGY CO., LTD., Beijing (CN)

(72) Inventor: Hongshu Zhang, Beijing (CN)

(73) Assignees: BOE TECHNOLOGY GROUP CO., LTD., Beijing (CN); BEIJING BOE DISPLAY TECHNOLOGY CO., LTD., Beijing (CN)

( * ) Notice: Subject to any disclaimer, the term of this patent is extended or adjusted under 35 U.S.C. 154(b) by 94 days.

(21) Appl. No.: 14/408,051

(22) PCT Filed: Apr. 29, 2014

(86) PCT No.: PCT/CN2014/076437
§ 371 (c)(1),
(2) Date: Dec. 15, 2014

(87) PCT Pub. No.: WO2015/035787
PCT Pub. Date: Mar. 19, 2015

(65) Prior Publication Data
US 2015/0338675 A1 Nov. 26, 2015

(30) Foreign Application Priority Data
Sep. 13, 2013 (CN) .......................... 2013 1 0416881

(51) Int. Cl.
G02B 27/28 (2006.01)
G02B 5/20 (2006.01)
(Continued)

(52) U.S. Cl.
CPC ........... *G02B 27/288* (2013.01); *G02B 5/201* (2013.01); *G02B 5/205* (2013.01); *G02B 5/26* (2013.01);
(Continued)

(58) Field of Classification Search
CPC .... G02B 27/288; G02B 5/201; G02B 5/3083; G02B 27/283; G02B 5/285–5/289;
(Continued)

(56) References Cited

U.S. PATENT DOCUMENTS

2009/0040431 A1* 2/2009 Lazarev ............... G02B 6/0056
349/65
2009/0040440 A1 2/2009 Park
(Continued)

FOREIGN PATENT DOCUMENTS

| CN | 1648752 A | 8/2005 |
| CN | 1776505 A | 5/2006 |

(Continued)

OTHER PUBLICATIONS

Search Report issued in International Application No. PCT/CN2014/076437, thirteen (13) pages.

*Primary Examiner* — Thomas K Pham
*Assistant Examiner* — Marin Pichler
(74) *Attorney, Agent, or Firm* — Nath, Goldberg & Meyer; Joshua B. Goldberg

(57) ABSTRACT

A color filter, a display device using the color filter, and a method for preparing the color filter are provided. The color filter is provided with a plurality of pixel regions in one-to-one correspondence to light within a plurality of different wavebands, respectively. The color filer comprises a plurality of stacked dielectric films. Each of the dielectric films reflects light within one waveband and transmits light within other wavebands. In each of the pixel regions, the dielectric
(Continued)

film for reflecting light within a waveband corresponding to this pixel region is replaced with a polarization-separation film for reflecting light in a first polarization direction and transmitting light in a second polarization direction. The color filter provided by embodiments of the present invention improves the transmittance of incident light and the utilization ratio of the incident light and can further provide powerful technical support for the enhancement of image display quality.

20 Claims, 2 Drawing Sheets

(51) Int. Cl.
G02B 5/30 (2006.01)
G02F 1/1335 (2006.01)
G02B 5/28 (2006.01)
G02B 5/26 (2006.01)

(52) U.S. Cl.
CPC ........... *G02B 5/285* (2013.01); *G02B 5/3083* (2013.01); *G02B 27/283* (2013.01); *G02F 1/133514* (2013.01); *G02F 1/133516* (2013.01); *G02F 1/133533* (2013.01); *G02F 1/133536* (2013.01); *G02F 2001/133521* (2013.01); *G02F 2001/133538* (2013.01); *G02F 2001/133545* (2013.01); *Y10T 156/10* (2015.01)

(58) Field of Classification Search
CPC ..... G02B 5/205; G02B 5/26; G02F 1/133533; G02F 1/133516; G02F 1/133514; G02F 1/133536; Y10T 156/10
USPC .......... 359/584–590, 489.1, 489.11, 489.12, 359/489.13, 79, 104–106; 349/80, 79, 349/104–106
See application file for complete search history.

(56) References Cited

U.S. PATENT DOCUMENTS

2009/0190072 A1* 7/2009 Nagata ................. G02B 6/0028
349/96
2011/0116010 A1* 5/2011 Nagata .................. G02B 6/005
349/62

FOREIGN PATENT DOCUMENTS

CN 103472515 A 12/2013
EP 2023190 A1 2/2009

* cited by examiner

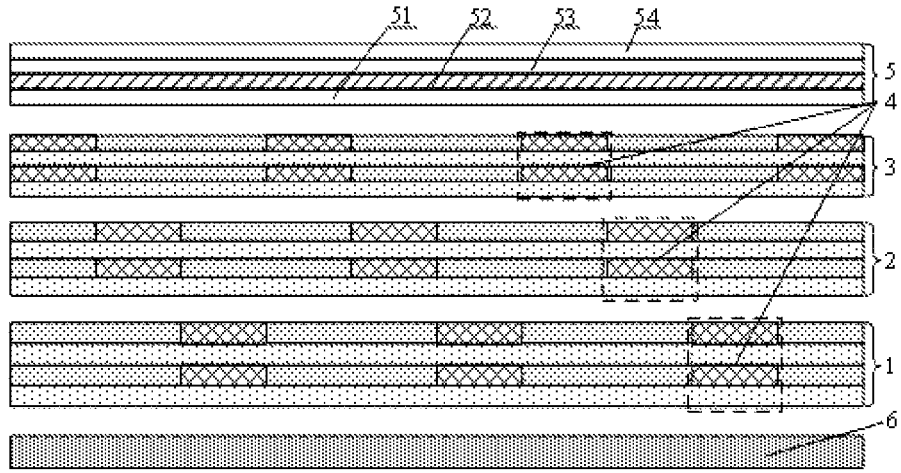

Fig. 3

| Preparing a plurality of dielectric films and stacking the dielectric films, wherein each of the dielectric films reflects light within one waveband and transmits light within other wavebands | Step 1 |

| Dividing the plurality of stacked dielectric films into a plurality of pixel regions in one-to-one correspondence to light within a plurality of different wavebands, respectively | Step 2 |

| In each of the pixel regions, replacing the dielectric film for reflecting light within the waveband corresponding to this pixel region with a polarization-separation film for reflecting light in a first polarization direction and transmitting light in a second polarization direction | Step 3 |

Fig. 4

COLOR FILTER AND PREPARATION METHOD THEREOF, AND DISPLAY DEVICE

This is a National Phase Application filed under 35 U.S.C. 371 as a national stage of PCT/CN2014/076437, filed Apr. 29, 2014, and claims priority benefit from Chinese Application No. 201310416881.0, filed Sep. 13, 2013, the content of each of which is hereby incorporated by reference in its entirety.

FIELD OF THE INVENTION

The present invention relates to the technical field of display, and particularly to a color filter, a display device using the color filter and a method for preparing the color filter.

BACKGROUND OF THE INVENTION

Compared with conventional cathode ray tube display devices, flat panel display devices have the advantages of light weight, thin thickness, low driving voltage, no flicker or jitter, long service life and so on. The flat panel display devices are mainly classified into active light-emitting display devices and passive light-emitting display devices. For example, Thin Film Transistor-Liquid Crystal Displays (TFT-LCD) are passive light-emitting display devices. With the advantages of stable pictures, realistic images, small radiation, space saving, low energy consumption and so on, the thin film transistor-liquid crystal displays are widely applied in TV sets, mobile phones and other electronic products and have predominated in the field of flat panel display.

In liquid crystal display devices which are passive light-emitting display devices, backlight modules or ambient light are needed to provide light sources for the liquid crystal display devices since liquid crystal display panels themselves are non-luminous. In the prior art, to correctly display color images, a color filter is usually mounted in front (i.e., a light exiting direction) of a backlight module. Thus, after light provided by the backlight module or external environment enters the color filter (CF for short), the color filter may accurately select light within a specific waveband to allow the light to pass therethrough, and reflect or absorb undesired light within other wavebands. Thereby, an observer may receive saturated light of a certain color, and the color image display is finally realized.

In the prior art, absorption type color filters are usually used. That is, a color filter only allows incident light within a specific waveband to pass therethrough and absorbs incident light within other wavebands. For example, a red pixel region allows only red light in the incident light to pass therethrough, while light of other colors in the incident light is absorbed. Thus, on one hand, the transmittance of the incident light is very low (about 30% only); on the other hand, it is likely to result in temperature rise after the color filter absorbs light energy, so that the service life of the color filter is reduced.

In addition, a polarizing sheet is generally provided on a light entering side of a liquid crystal display panel. Light entering the liquid crystal display panel becomes polarized light by using the polarizing sheet, and then image display is realized by the polarized light by virtue of refractivity anisotropy of liquid crystal molecules in the display panel. Majority of polarizing sheets used in the liquid crystal display devices in the prior art are absorption type polarizing sheets. For example, the polarizing sheets will usually absorb about 50% of light in a non-preset polarization direction. Thus, the transmittance of incident light and the utilization ratio of the incident light are further reduced, and it is difficult to enhance the contrast ratio of the display devices, so that it is difficult to ensure the quality of image display.

SUMMARY OF THE INVENTION (1) Technical Problem to be Solved

An objective of the present invention is to provide a color filter, a display device using the color filter, and a method for preparing the color filter, which can enhance the transmittance of incident light and the utilization ratio of the incident light and realize the effect of enhancing the quality of image display.

(2) Technical Solutions

The technical solutions of the present invention are as follows:

There is provided a color filter, which has a plurality of pixel regions in one-to-one correspondence to light within a plurality of different wavebands respectively. The color filer includes a plurality of stacked dielectric films, and each of the dielectric films reflects light within one waveband and transmits light within other wavebands; and in each of the pixel regions, the dielectric film for reflecting light within a waveband corresponding to this pixel region is replaced with a polarization-separation film for reflecting light in a first polarization direction and transmitting light in a second polarization direction.

Preferably, the pixel regions include a first pixel region corresponding to light within a first waveband, a second pixel region corresponding to light within a second waveband, and a third pixel region corresponding light within a third waveband, wherein the dielectric films include a first dielectric film for reflecting light within the first waveband and transmitting light within wavebands except the first waveband, a second dielectric film for reflecting light within the second waveband and transmitting light within wavebands except the second waveband, and a third dielectric film for reflecting light within the third waveband and transmitting light within wavebands except the third waveband; and a portion of the first dielectric film in the first pixel region, a portion of the second dielectric film in the second pixel region, and a portion of the third dielectric film in the third pixel region are replaced with the polarization-separation film.

Preferably, the light within the first waveband is red light, the light within the second waveband is green light, and the light within the third waveband is blue right.

Preferably, the polarization direction of the light in the first polarization direction is perpendicular to that of the light in the second polarization direction; the polarization-separation film comprises isotropic layers and anisotropic layers, the isotropic layers and the anisotropic layers being vertically alternated and stacked, wherein refractive indexes of the isotropic layers with respect to the light in the first polarization direction and the light in the second polarization direction perpendicular to the first polarization direction are identical; and refractive indexes of the anisotropic layers with respect to the light in the first polarization direction and the light in the second polarization direction perpendicular to the first polarization direction are different.

Preferably, for the light in the first polarization direction, the refractive index of the isotropic layers is larger than that of the anisotropic layers; and for the light in the second polarization direction, the refractive index of the isotropic layers is equal to that of the anisotropic layers.

Preferably, each of the dielectric films includes a first dielectric layer and a second electric layer which are vertically alternated and stacked; the refractive index of the first dielectric layer is larger than that of the second dielectric layer; the number of the layers included in each of the dielectric films is the same as that of the layers included in the polarization-separation film replacing this dielectric film; and the isotropic layer of the polarization-separation film is the second dielectric layer.

Preferably, the refractive index of the first dielectric layer is at least 0.2 larger than that of the second dielectric layer.

Preferably, the total number of the dielectric films is 50 to 400.

The present invention further provides a display device using any one of the color filters described above. The display device includes a display panel and a color filter disposed on a light entering side of the display panel; and the color filter is any one of the color filters described above.

Preferably, a correction polarizing sheet is disposed between the color filter and the display panel, and a polarization axis of the correction polarizing sheet is the same as the polarization direction of the light in the second polarization direction.

Preferably, the correction polarizing sheet includes a polarizing film and an upper base film, and one surface of the polarizing film is fitted with the upper base film while the other surface thereof is fitted with the color filter.

Preferably, the display device further includes a reflecting sheet disposed on the light entering side of the display panel, and the color filter is disposed between the reflecting sheet and the display panel.

The present invention further provides a method for preparing any one of the color filters described above, including the following steps:

preparing the plurality of dielectric films and stacking the dielectric films, wherein each of the dielectric films reflects light within one waveband and transmits light within other wavebands;

dividing the plurality of stacked dielectric films into a plurality of pixel regions in one-to-one correspondence to light within a plurality different wavebands respectively; and in each of the pixel regions, replacing a dielectric film for reflecting light within waveband corresponding to this pixel region with a polarization-separation film for reflecting light in a first polarization direction and transmitting light in a second polarization direction.

Preferably, the method further includes:

fabricating anisotropic layers in the polarization-separation film, so that the refractive indexes of the anisotropic layers with respect to the light in the first polarization direction and the light in the second polarization direction are different;

wherein the step of preparing the plurality of dielectric films includes: fabricating first dielectric layers and second dielectric layers, and alternately stacking the first dielectric layers and the second dielectric layers to form the dielectric films; and the replacement step includes: in each of the pixel regions, replacing the first dielectric layer of the dielectric film for reflecting light within a waveband corresponding to the pixel region with the anisotropic layer of the polarization-separation film.

(3) Advantageous Effects

In the color filter provided by embodiments of the present invention, by providing a plurality of dielectric films capable of reflecting light within different specific wavebands and transmitting light within other wavebands respectively, and by replacing a corresponding dielectric film in a pixel region of each color with a polarization-separation film, on one hand, the dielectric films may allow light within desired wavebands to transmit through the color filter and reflect light within other wavebands; on the other hand, the polarization-separation film may allow light in a desired polarization direction to transmit through the polarization-separation film and reflect light in other polarization directions. Therefore, the light reflected by the dielectric films and the polarization-separation film may enter the dielectric films and the polarization-separation film again under the action of a reflecting sheet or other optical films, so that both the transmittance of incident light and the utilization ratio of the incident light are improved, and a powerful technical support may be thus provided for the enhancement of image display quality.

BRIEF DESCRIPTION OF THE DRAWINGS

FIG. 3 is a schematic diagram showing a partial structure of a display device according to an embodiment of the present invention; and FIG. 4 is a flowchart of a method for preparing a color filter according to an embodiment of the present invention;

DETAILED DESCRIPTION OF THE EMBODIMENTS

Figure 1:
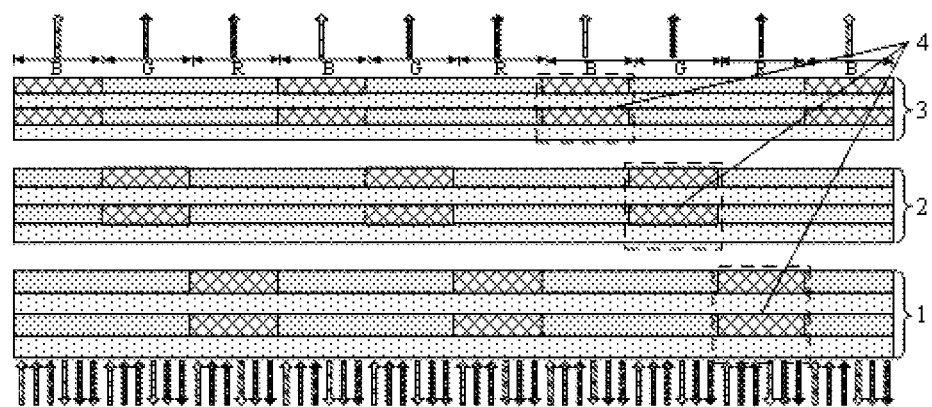
FIG. 1 is a schematic diagram showing the structure of a color filter according to an embodiment of the present invention.

Specific embodiments of the present invention will be further described as below with reference to the accompanying drawings and embodiments. The following embodiments are merely used for describing the present invention, but are not intended to limit the scope of the present invention.

According to an embodiment of the present invention, a color filter is provided. The color filter has a plurality of pixel regions in one-to-one correspondence to light within a plurality of different wavebands respectively. The color filter includes a plurality of stacked dielectric films, each of which reflects light within one waveband and transmits light within other wavebands. In each of the pixel regions, the dielectric film for reflecting light within a waveband corresponding to this pixel region is replaced with a polarization-separation film for reflecting light in a first polarization direction and transmitting light in a second polarization direction. Preferably, the polarization direction of the light in the first polarization direction is perpendicular to that of the light in the second polarization direction. For example, the pixel regions include a first pixel region corresponding to light within a first waveband, a second pixel region corresponding to light within a second waveband, and a third pixel region corresponding light within a third waveband. The dielectric films include a first dielectric film for reflecting light within the first waveband and transmitting light within wavebands except the first waveband (i.e., light outside the first waveband), a second dielectric film for reflecting light within the second waveband and transmitting light within wavebands except the second waveband (i.e., light outside the second waveband), and a third dielectric film for reflecting light within the third waveband and transmitting light within wavebands except the third waveband (i.e., light outside the third waveband). A portion of the first dielectric film in the first pixel region, a portion of the second dielectric film in the second pixel region, and a portion of the third dielectric film in the third pixel region are replaced with the polarization-separation film. Thus, on one hand, each of the dielectric films may allow light within a desired waveband (light outside the first waveband, light outside the second waveband or light outside the third waveband) to transmit through a corresponding pixel region in the color filter and reflect light within other wavebands except the desired waveband (light within the first waveband, light within the second waveband or light within the third waveband); on the other hand, the polarization-separation film may allow light in a desired polarization direction (light in the second polarization direction) to transmit through the polarization-separation film and reflect light in other polarization directions (light in the first polarization direction). The light reflected by the dielectric films and the polarization-separation film may enter the dielectric films and the polarization-separation film again under the action of the reflecting sheet or other optical films, so that both the transmittance of incident light and the utilization ratio of the incident light are improved, and a powerful technical support may be thus provided for the enhancement of image display quality.

The color filter according to an embodiment of the present invention will be described in details by taking a common RGB (Red, Green, Blue) color mixture scheme as an example, wherein the light within the first waveband is red light (the wavelength range is 600 nm-780 nm), the light within the second waveband is green light (the wavelength range is 480 nm-600 nm), and the light within the third waveband is blue light (the wavelength range is 390 nm-480 nm). Correspondingly, the first pixel region is a red pixel region, the second pixel region is a green pixel region, and the third pixel region is a blue pixel region.

Figure 2:
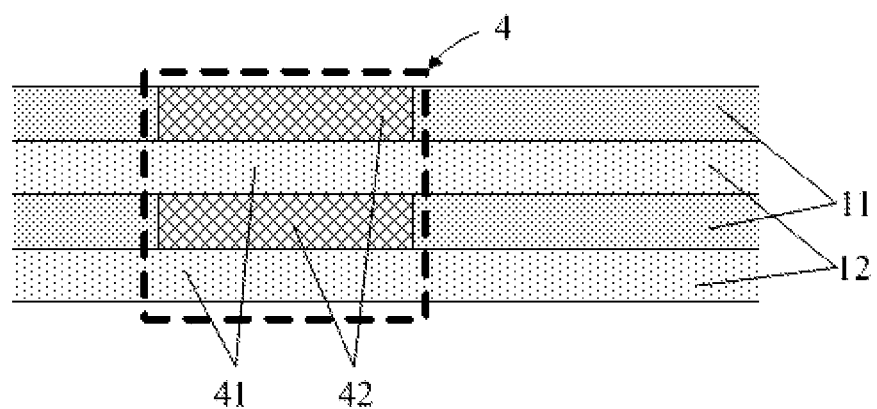
FIG. 2 is a schematic diagram showing a partial structure of the color filter shown in FIG. 1.

FIG. 1 is a schematic diagram showing the structure of a color filter according to an embodiment of the present invention. FIG. 2 is a schematic diagram showing a partial structure of the color filter shown in FIG. 1. As shown in FIG. 1 and FIG. 2, the color filter includes a first dielectric film 1 for reflecting red light and transmitting blue light and green light, a second dielectric film 2 for reflecting green light and transmitting red light and blue light, and a third dielectric film 3 for reflecting blue light and transmitting red light and green light. The first dielectric film 1, the second dielectric film 2 and the third dielectric film 3 are mutually stacked (i.e., arranged in parallel in a thickness direction). Moreover, a portion of the first dielectric film 1 in the red pixel region is replaced with the polarization-separation film 4, a portion of the second dielectric film 2 in the green pixel region is replaced with the polarization-separation film 4, and a portion of the third dielectric film 3 in the blue pixel region is replaced with the polarization-separation film 4. By taking the blue pixel region on the leftmost side in the drawings as an example, the portion of the third dielectric film 3 in the blue pixel region is replaced with the polarization-separation film 4, so there are actually the first dielectric film 1 and the second dielectric film 2 only in the blue pixel region. When incident light such as backlight or ambient light (may be regarded as three-primary-color light) reaches the first dielectric film 1, red light in the incident light is reflected, while green light and blue light pass through the first dielectric film 1 and are incident on the second dielectric film 2. When the green light and blue light reach the second dielectric film 2, the green light is also reflected, and only the blue light passes through the second dielectric film 2 and is further incident on the polarization-separation film 4. When the blue light reaches the polarization-separation film 4, light in the first polarization direction is reflected, while light in the second polarization direction passes through the polarization-separation film 4 and is incident on the display panel. The situation of the incident light in the red pixel region and the green pixel region is similar to the situation of the incident light in the blue pixel region. The order of the first dielectric film, the second dielectric film and the third dielectric film when they are fitted with each other does not influence the optical characteristics of the color filter according to this embodiment, and will not be limited specifically herein.

In the drawings, for purpose of clarity, although the dielectric films are shown as being spaced with each other in a certain distance, it will be appreciated that they may also be fitted with each other. In addition, other layers, for example, transparent adhesive layers, may also be provided between the dielectric films as required.

In a preferable embodiment of the present invention, a specific example of the dielectric films 1-3 and the polarization-separation film 4 is provided. As shown in FIG. 1 and FIG. 2, a plurality of dielectric layers having different refractive indexes are stacked alternately to form the dielectric films, and isotropic layers 41 and anisotropic layers 42 are stacked alternately to form the polarization-separation film 4. In the drawings, for purpose of convenience, although it is shown that both each of the dielectric films and the polarization-separation film 4 include four layers, it will be appreciated that the number of the layers is exemplary and is not intended to limit the present invention. A person having ordinary skill in the art may set the number of the layers included in each of the dielectric films and the number of the layers included in the polarization-separation film according to actual requirements. Preferably, the number of the layers included in each of the dielectric films is the same as the number of the layers included in the polarization-separation film replacing this dielectric film.

In this preferable embodiment, each of the dielectric films may include a first dielectric layer 11 and a second dielectric layer 12 which are vertically alternated and stacked, and the refractive index of the first dielectric layer 11 may be larger than that of the second dielectric layer 12. A relationship between the thickness of one dielectric layer and the wavelength of light reflected by this dielectric layer is as follows: $d=\lambda/4n$, wherein d is the thickness of the dielectric layer, $\lambda$ is the wavelength of the light reflected by the dielectric layer, and n is the refractive index of the dielectric layer. It can be seen that the wavelength $\lambda$ of the reflected light of the dielectric layer may be changed by changing the thickness d of the dielectric layer. If the dielectric layers with different thicknesses are stacked by a multilayer stacking method, a dielectric film having a wide reflection bandwidth may be formed. With the increase of the thickness of each of the dielectric layers in a dielectric film, the reflection bandwidth of each of the dielectric layers is superposed with each other thus to obtain a dielectric film having a wider reflection bandwidth as a whole. Moreover, by properly selecting the thickness of each of the dielectric layers in the dielectric films, the dielectric films may be allowed to reflect visible light within all wavebands.

Specifically, for example, each of the first dielectric film, the second dielectric film and the third dielectric film may include a plurality of periods, each of which is formed by overlapping two dielectric layers having different refractive indexes (a difference between the refractive index of a high refractive index dielectric layer and the refractive index of a low refractive index dielectric layer is greater than or equal to 0.2). For any one of the first dielectric film, the second dielectric film and the third dielectric film, if the reflection wavelength range of this dielectric film is $L_1$-$L_2$, and if the dielectric layers are arranged in an order from low refractive index to high refractive index (that is, the low refractive index dielectric layer is arranged before the high refractive index dielectric layer) in the direction of incident light so that light is incident on the low refractive index dielectric layer firstly in each period, then in the dielectric film:

the thickness of the low refractive index dielectric layer in a period i is $d_{1i}=[L_1+k(2i-1-1)]/4n_1$, and the thickness of the high refractive index dielectric layer in the period i is $d_{2i}=[L_1+k(2i-1)]/4n_2$;

if the low refractive index dielectric layer is arranged behind the high refractive index dielectric layer in the direction of the incident light, then in the dielectric film:

the thickness of the low refractive index dielectric layer in the period i is $d_{1i}=[L_1+k(2i-1)]/4n_1$, and the thickness of the high refractive index dielectric layer in the period i is $d_{2i}=[L_1+k(2i-1-1)]/4n_2$;

wherein k is an incremental coefficient, and $0.5 \leq k \leq 16$; i is a natural number, and $0 < i \leq Z/2$; $n_1$ is the refractive index of the low refractive index dielectric layer; $n_2$ is the refractive index of the high refractive index dielectric layer; and Z is the total number of the low refractive index dielectric layers and the high refractive index dielectric layers in the dielectric film.

The incremental coefficient k corresponds to a difference between wavelengths of lights reflected by two adjacent dielectric layers and is related to the total number Z. Preferably, $k=(L_2-L_1)/(Z-1)$.

In this preferable embodiment, the polarization-separation film 4 may include isotropic layers 41 and anisotropic layers 42 which are vertically alternated and stacked, wherein the refractive indexes of the isotropic layers 41 with respect to the light in the first polarization direction and the light in the second polarization direction perpendicular to the first polarization direction are identical, while the refractive indexes of the anisotropic layers 42 with respect to the light in the first polarization direction and the light in the second polarization direction perpendicular to the first polarization direction are different. For example, for the light in the first polarization direction, the refractive index of the anisotropic layers 42 is larger than that of the isotropic layers 41. For example, the refractive index of the anisotropic layers 42 may be equal to that of the first dielectric layer. For the light in the second polarization direction, the refractive index of the anisotropic layers 42 is equal to that of the isotropic layers 41. For example, the refractive index of the anisotropic layers 42 may be equal to that of the second dielectric layer. Since the difference between the refractive indexes of two adjacent dielectric layers (for example, the first dielectric layer and the second dielectric layer) is larger than or equal to 0.2, the difference between the refractive index of the anisotropic layers 42 with respect to the light in the first polarization direction and the refractive index of the anisotropic layers 42 with respect to the light in the second polarization direction is at least 0.2. Thus, when the polarization direction of the light in the first polarization direction is perpendicular to the polarization direction of the light in the second polarization direction, the light in the first polarization direction will be reflected by the polarization-separation film 4, while the light in the second polarization direction will transmit through the polarization-separation film 4. Wherein the light in the first polarization direction may be polarized light having a polarization direction of 0°, and the light in the second polarization direction may be polarized light having a polarization direction of 90°; alternatively, the light in the first polarization direction may be polarized light having a polarization direction of 90°, and the light in the second polarization direction may be polarized light having a polarization direction of 0°.

In order to save materials and reduce process steps, in a preferable embodiment of the present invention, the second dielectric layer 12 may be used as the isotropic layers 41 of the polarization-separation film 4. Thus, when the portion of the first dielectric film 1 in the red pixel region is replaced with the polarization-separation film 4, the portion of the second dielectric film 2 in the green pixel region is replaced with the polarization-separation film 4 and the portion of the third dielectric film 3 in the blue pixel region is replaced with the polarization-separation film 4, it is only required that the first dielectric layer 11 of the corresponding pixel region is replaced with the anisotropic layers 42. Thus, it is unnecessary to separately form the isotropic layers 41 of the polarization-separation film 4, so that the process steps are reduced while saving materials.

In the drawings, for convenience of description, the first dielectric layer 11, thicknesses of the second dielectric layer 12 and the anisotropic layers 42 are exaggerated. In fact, the first dielectric layer 11, the second dielectric layer 12 and the anisotropic layers 42 are formed of thin films being 50-100 μm in thickness. For example, the anisotropic layers 42 may be formed from polymer materials (such as polyethylene naphthalate (PEN) or polyethylene terephthalate (PET)) formed by stretching polymer materials, or liquid crystal polymers formed by photocuring nematic liquid crystals. In addition, the anisotropic layers 42 may also be formed from another polymer materials (such as syndiotactic polystyrene (PS)) formed by stretching polymer materials, or liquid crystal polymers formed by photocuring discotic liquid crystals. The first dielectric layer 11 and the second dielectric layer 12 may be formed from organic materials such as polyethylene terephthalate, or oxide material or nitride material such as titanium dioxide, silicon dioxide, titanium pentoxide, aluminum oxide and silicon nitride. The more the numbers of the first dielectric layer 11, the second dielectric layer 12 and the anisotropic layers 42 are, the better the reflection effect is. However, in a practical application, the thickness of the finally assembled display device also needs to be taken into consideration. Therefore, in this preferable embodiment, the total number of the dielectric layers included in the dielectric films is within a range of 50-400.

It should be noted that, in other color mixture schemes, for example, in RGBY (red, green, blue, yellow), RGBW (red, green, blue, white), RGBK (red, green, blue, black), CMY (cyan, magenta, yellow), CMYK (cyan, magenta, yellow, black) and the like, those skilled in the art may apply the technical solutions provided by the present invention to the above color mixture schemes without any creative effort, which shall fall into the protection scope of the present invention. For example, for the RGBK color mixture scheme, the color filter provided by the present invention may still include a first dielectric film 1, a second dielectric film 2, and a third dielectric film 3 which are stacked. A portion of the first dielectric film 1 in a red pixel region is replaced with the polarization-separation film 4; a portion of the second dielectric film 2 in a green pixel region is replaced with the polarization-separation film 4; a portion of the third dielectric film 3 in a blue pixel region is replaced with the polarization-separation film 4; while in a black pixel region, no dielectric film is replaced with the polarization-separation film 4. The arrangement of the dielectric films for other color mixture schemes is similar to this.

A display device according to an embodiment of the present invention will be described as below in details with reference to FIG. 3. The display device includes a display panel (not shown) and the color filter according to an embodiment of the present invention disposed on a light entering side of the display panel. In the display device, since the color filter may reflect light outside a desired waveband and light not in a desired polarization direction, and the reflected light may enter a dielectric film and the polarization-separation film 4 replacing this dielectric film again under the action of a reflecting sheet or other optical films, both the transmittance of incident light and the utilization ratio of the incident light being improved. Thus, the image display quality of the display device may be effectively enhanced. Moreover, since the polarization-separation film 4 is integrated in the color filter, under ideal conditions, the polarized light required for the display of the display device may be generated by the polarization-separation film 4. Thus, it may be unnecessary to install a polarizing sheet on a light entering side of the display panel. In this way, the cost is saved, and the display device may become lighter and thinner.

However, in a practical application, due to the limitations of technology, the light passing through the polarization-separation film 4 in the second polarization direction may still be mingled with light in the first polarization direction. Therefore, in a preferable embodiment, a correction polarizing sheet 5 is further provided between the color filter and the display panel, with a polarization axis of the correction polarizing sheet 5 being the same as the polarization direction of the light in the second polarization direction. Under the action of the correction polarizing sheet 5, the mingled light in the first polarization direction may be removed completely. For example, when the light in the second polarization direction is polarized light having a polarization direction of 90°, a correction polarizing sheet 5 having a polarization axis of 90° may be selected. When the light in the second polarization direction is polarized light having a polarization direction of 0°, a correction polarizing sheet 5 having a polarization axis of 0° may be selected.

The correction polarizing sheet 5 in this embodiment may be a common polarizing sheet in the prior art, that is, as shown in FIG. 3, the correction polarizing sheet 5 includes a polarizing film 52 and an upper base film 53 and a lower base film 51 which are fitted with upper and lower sides of the polarizing film 52 respectively. The upper base film 53 and the lower base film 51 mainly play a role of protecting and fixing the polarizing film 53, and may be made from polyethylene terephthalate (PET), polymethyl methacrylate (PMMA), polycarbonate (PC) or other materials. In addition, the correction polarizing sheet 5 may further include a protective film 54 for protecting the whole correction polarizing sheet. Further, since the correction polarizing sheet in this embodiment is directly fitted with a color filter, the polarizing film 52 may be protected and fixed by the color filter, that is, the lower base film 51 may be replaced with the color filter, so that the thickness of the correction polarizing sheet 5 may be reduced to a certain extent and the purpose of saving materials may be achieved.

Further, to make light reflected by the color filter to enter the color filter again as much as possible, in this embodiment, a reflecting sheet 6 is further provided on a light entering side of the display panel, and the color filter is disposed between the reflecting sheet 6 and the display panel. Thus, the light reflected by the color filter enters the color filter again by virtue of the reflecting sheet 6, so that the effects of improving the transmittance of incident light and the utilization ratio of the incident light may be better achieved.

Since a liquid crystal display panel does not emit light by itself, it is usually required to provide a backlight module for providing a light source for the liquid crystal display panel. The backlight module in the prior art mainly includes a light-emitting element, a light guide plate and a reflecting sheet disposed on the rear surface of the light guide plate. The rear surface of the light guide plate refers to a surface opposite to a light exiting surface of the light guide plate. The light guide plate mainly functions as uniformly guiding a light beam emitted by the light-emitting element upward, while the reflecting sheet is used for reflecting light escaping from the bottom surface of the light guide plate back to the light guide plate, thus to improve the utilization ratio of the light source. An optical film, used for changing a direction of light exiting from the light guide plate and enhancing the intensity of the emergent light and the like, is provided on the light exiting surface of the light guide plate. Since the backlight module is disposed on a light entering side of the color filter, the light reflected by the color filter may enter the color filter again by virtue of the reflection of the reflecting sheet in the backlight module, so that it is unnecessary to provide a reflecting sheet 6 separately.

A method for preparing the above-mentioned color filter according to an embodiment of the present invention will be described as below in details with reference to FIG. 4.

As shown in FIG. 4, the method for preparing the color filter mainly includes the following steps:

Step 1: preparing a plurality of dielectric films and stacking the dielectric films, wherein each of the dielectric films reflects light within one waveband and transmits light within other wavebands; for example, fabricating a first dielectric film 1, a second dielectric film 2, and a third dielectric film 3, respectively;

Step 2: dividing the plurality of stacked dielectric films into a plurality of pixel regions in one-to-one correspondence to light within a plurality of different wavebands respectively; and Step 3: in each of the pixel regions, replacing the dielectric film for reflecting light within the waveband corresponding to this pixel region with a polarization-separation film 4 for reflecting light in a first polarization direction and transmitting light in a second polarization direction; for example, replacing a portion of the first dielectric film 1 in a red pixel region with the polarization-separation film 4, replacing a portion of the second dielectric film 2 in a green pixel region with the polarization-separation film 4, and replacing a portion of the third dielectric film 3 in a blue pixel region with the polarization-separation film 4. Preferably, the polarization direction of the light in the first polarization direction is perpendicular to the polarization direction of the light in the second polarization direction.

According to a preferable embodiment of the present invention, before Step 3, the method for preparing the color filter further includes the following steps:

fabricating anisotropic layers 42 in the polarization-separation film 4, so that the refractive indexes of the anisotropic layers 42 with respect to the light in the first polarization direction and the light in the second polarization direction are different.

Preferably, Step 1 is specifically as follows: forming a first dielectric layer 11 and a second dielectric layer 12 with a preset thickness, and alternately stacking the first dielectric layer 11 and the second dielectric layer 12 to form the dielectric films.

Preferably, Step 2 is specifically as follows: in each of the pixel regions, replacing all of the first dielectric layers 11 of the dielectric film for reflecting light within a waveband corresponding to the pixel region with the anisotropic layers 42 in the polarization-separation film 4.

Specifically, by taking a common RGB (red, green, blue) color mixture scheme as an example, firstly, a portion of the first dielectric layer 11 of the first dielectric film 1 in a red pixel region is removed, a portion of the first dielectric layer 11 of the second dielectric film 2 in a green pixel region is removed, and a portion of the first dielectric layer 11 of the third dielectric film 3 in a blue pixel region is removed. The removal method may be laser cutting or other known methods. Secondly, the anisotropic layers 42 are formed. By laser cutting or other known methods, the anisotropic layers 42 are formed in a shape matched with the removed portion of the first dielectric layer 11. Subsequently, the anisotropic layers 42 are disposed in a portion of the first dielectric film 1 where the first dielectric layers 11 are removed, the anisotropic layers 42 are disposed in a portion of the second dielectric film 2 where the first dielectric layers 11 are removed, and the anisotropic layers 42 are disposed in a portion of the third dielectric film 3 where the first dielectric layers 11 are removed. Finally, in a preset order, the first dielectric layers 11 including the anisotropic layers 42 and the second dielectric layers 12 serving as the isotropic layers are stacked alternately and laminated to form the color filter provided in this embodiment.

It can be apparently seen that, the method for preparing a color filter provided by this embodiment may simultaneously form the dielectric firms and the polarization-separation film 4. Moreover, by using the second dielectric layers 12 as the isotropic layers of the polarization-separation film 4, the materials are saved while the process steps are reduced, and the production cost is thus reduced.

The foregoing embodiments are merely used for describing the present invention, but are not intended to limit the present invention. A person having ordinary skill in the relevant art may also make various modifications and variations without departing from the spirit and scope of the present invention, so all the equivalent technical solutions shall fall into the protection scope of the present invention.

The invention claimed is:

1. A color filter, comprising a first pixel region corresponding to light within a first waveband and a second pixel region corresponding to light within a second waveband different from the first waveband, wherein,
the color filer comprises a first film and a second film which are vertically stacked, the first film comprises a first dielectric film for reflecting the light within the first waveband and transmitting light within wavebands except the first waveband and a polarization-separation film arranged in a same layer with the first dielectric film, and the second film comprises a second dielectric film for reflecting the light within the second waveband and transmitting light within wavebands except the second waveband and a polarization-separation film arranged in a same layer with the second dielectric film;
the polarization-separation films in the first and second films reflect light in a first polarization direction and transmitting light in a second polarization direction;
the polarization-separation film in the first film is disposed in the first pixel region, and the first dielectric film is disposed in all other regions than the first pixel region;
the polarization-separation film in the second film is disposed in the second pixel region, and the second dielectric film is disposed in all other regions than the second pixel region; and
each of the first dielectric film and the second dielectric film comprises a first dielectric layer and a second dielectric layer which are vertically alternated and stacked, the polarization-separation films in the first film and the second film comprise isotropic layers and anisotropic layers which are vertically alternated and stacked, and the isotropic layer is the second dielectric layer.

2. The color filter according to claim 1, further comprising a third pixel region corresponding light within a third waveband which is different from the first and second wavebands, wherein
the color filter further comprises a third film vertically stacked on the first film and the second film;
the third film comprises a third dielectric film for reflecting the light within the third waveband and transmitting light within wavebands except the third waveband and a polarization-separation film arranged in a same layer with the third dielectric film; the polarization-separation film in the third film reflects light in the first polarization direction and transmitting light in the second polarization direction;
the polarization-separation film in the third film is disposed in the third pixel region, and the third dielectric film is disposed in all other regions than the third pixel region; and
the third dielectric film comprises the first dielectric layer and the second dielectric layer which are vertically alternated and stacked, the polarization-separation film in the third film comprises the isotropic layer and the anisotropic layer which are vertically alternated and stacked, and at least one of the isotropic layers is the second dielectric layer.

3. The color filter according to claim 2, wherein, the light within the first waveband is red light, the light within the second waveband is green light, and the light within the third waveband is blue right.

4. The color filter according to claim 3, wherein, a polarization direction of the light in the first polarization direction is perpendicular to that of the light in the second polarization direction; wherein
refractive indexes of the isotropic layers with respect to the light in the first polarization direction and the light in the second polarization direction are identical; and refractive indexes of the anisotropic layers with respect to the light in the first polarization direction and the light in the second polarization direction are different.

5. The color filter according to claim 4, wherein, for the light in the first polarization direction, the refractive index of the isotropic layers is larger than that of the anisotropic layers; and for the light in the second polarization direction, the refractive index of the isotropic layers is equal to that of the anisotropic layers.

6. The color filter according to claim 2, wherein, a polarization direction of the light in the first polarization direction is perpendicular to that of the light in the second polarization direction; wherein
refractive indexes of the isotropic layers with respect to the light in the first polarization direction and the light in the second polarization direction are identical; and refractive indexes of the anisotropic layers with respect to the light in the first polarization direction and the light in the second polarization direction are different.

7. The color filter according to claim 6, wherein, for the light in the first polarization direction, the refractive index of the isotropic layers is larger than that of the anisotropic layers; and for the light in the second polarization direction, the refractive index of the isotropic layers is equal to that of the anisotropic layers.

8. The color filter according to claim 1, wherein, a polarization direction of the light in the first polarization direction is perpendicular to that of the light in the second polarization direction; wherein
refractive indexes of the isotropic layers with respect to the light in the first polarization direction and the light in the second polarization direction are identical; and
refractive indexes of the anisotropic layers with respect to the light in the first polarization direction and the light in the second polarization direction are different.

9. The color filter according to claim 8, wherein, for the light in the first polarization direction, the refractive index of the isotropic layers is larger than that of the anisotropic layers; and for the light in the second polarization direction, the refractive index of the isotropic layers is equal to that of the anisotropic layers.

10. The color filter according to claim 9, wherein, the refractive index of the first dielectric layer is larger than that of the second dielectric layer; and the number of layers included in each of the first dielectric film and the second dielectric film is the same as that of layers included in a corresponding polarization-separation film.

11. The color filter according to claim 10, wherein the refractive index of the first dielectric layer is at least 0.2 larger than that of the second dielectric layer.

12. The color filter according to claim 10, wherein the total number of the dielectric layers included in each of the first and second dielectric films is 50 to 400.

13. A display device, comprising a display panel and a color filter disposed on a light entering side of the display panel, wherein the color filter is the color filter according to claim 1.

14. The display device according to claim 13, wherein, the display device further comprises a reflecting sheet disposed on the light entering side of the display panel, and the color filter is disposed between the reflecting sheet and the display panel.

15. The display device according to claim 13, wherein, a correction polarizing sheet is disposed between the color filter and the display panel, and a polarization axis of the correction polarizing sheet is the same as the polarization direction of the light in the second polarization direction.

16. The display device according to claim 15, wherein, the display device further comprises a reflecting sheet disposed on the light entering side of the display panel, and the color filter is disposed between the reflecting sheet and the display panel.

17. The display device according to claim 15, wherein, the correction polarizing sheet comprises a polarizing film and an upper base film, and one surface of the polarizing film is fitted with the upper base film while the other surface thereof is fitted with the color filter.

18. The display device according to claim 17, wherein, the display device further comprises a reflecting sheet disposed on the light entering side of the display panel, and the color filter is disposed between the reflecting sheet and the display panel.

19. A method for preparing the color filter according to claim 1, comprising the following steps:
preparing the first and second dielectric films each comprising the first dielectric layer and the second dielectric layer;
dividing the first and second dielectric films into the first pixel region and the second pixel region, respectively;
fabricating the anisotropic layer in the polarization-separation film, so that the refractive indexes of the anisotropic layer with respect to the light in the first polarization direction and the light in the second polarization direction are different
in the first pixel region, replacing the first dielectric layer of the first dielectric film with the anisotropic layer of the polarization-separation film to obtain the first film, and in the second pixel region, replacing the first dielectric layer of the second dielectric film with the anisotropic layer of the polarization-separation film to obtain the second film; and
stacking the first and second films obtained after the replacing.

20. The method for preparing a color filter according to claim 19,
wherein the step of preparing the first and second dielectric films comprises: fabricating first dielectric layers and second dielectric layers, and alternately stacking the first dielectric layers and the second dielectric layers to form the dielectric films.

* * * * *